United States Patent
Abali et al.

(10) Patent No.: US 11,797,446 B2
(45) Date of Patent: Oct. 24, 2023

(54) MULTI PURPOSE SERVER CACHE DIRECTORY

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US); Brian Robert Prasky, Campbell Hall, NY (US); Jang-Soo Lee, Poughkeepsie, NY (US); Deanna Postles Dunn Berger, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 17/452,944

(22) Filed: Oct. 29, 2021

(65) Prior Publication Data

US 2023/0133372 A1    May 4, 2023

(51) Int. Cl.
*G06F 12/08*     (2016.01)
*G06F 12/0806*   (2016.01)
*G06F 12/0862*   (2016.01)

(52) U.S. Cl.
CPC ........ *G06F 12/0806* (2013.01); *G06F 12/0862* (2013.01); *G06F 2212/1008* (2013.01)

(58) Field of Classification Search
None
See application file for complete search history.

(56) References Cited

U.S. PATENT DOCUMENTS

| | | | |
|---|---|---|---|
| 7,240,160 B1* | 7/2007 | Hetherington et al. | G06F 12/0817 711/119 |
| 9,753,858 B2 | 9/2017 | Loh et al. | |
| 2009/0198865 A1* | 8/2009 | Arimilli et al. | G06F 12/0822 711/3 |

(Continued)

OTHER PUBLICATIONS

Hong et al., "Touche: Towards Ideal and Efficient Cache Compression by Mitigating Tag Area Overheads", In Proceedings of the 52nd Annual IEEE/ACM International Symposium on Microarchitecture, Oct. 2019, (Pages: 14).

Huiyang Zhou et al., "Adaptive mode control: A static-power-efficient cache design", ACM Transactions on Embedded Computing Systems, Volume 2, Issue 3, pp 347-372, DOI: 10.1145/860176.860181, Aug. 2003, (26 pages).

Lingda Li et al., "Tag-Split Cache for Efficient GPGPU Cache Utilization", ICS '16: Proceedings of the 2016 International Conference on Supercomputing, Jun. 2016, Article No.: 43, Pages 1-12, DOI: 10.1145/2925426.2926253, (12 pages).

Prihozhy et al., "Simulation of Direct Mapped, K-Way and Fully Associative Cache on all Pairs Shortest Paths Algorithms", Belarusian National Technical University, 2019, (Pages: 9).

(Continued)

*Primary Examiner* — Tracy C Chan
(74) *Attorney, Agent, or Firm* — GRIFFITHS & SEATON PLLC

(57) ABSTRACT

A multi-purpose server cache directory in a computing environment is provided. One of a plurality of operation modes may be selectively enabled or disabled, by a cache directory, based on a computation phase, data type, and data pattern for caching data in a cache having a plurality of address tags in the cache directory greater than a number of data lines in a cache array.

20 Claims, 11 Drawing Sheets

(56) References Cited

U.S. PATENT DOCUMENTS

| | | | |
|---|---|---|---|
| 2011/0320735 A1* | 12/2011 | Berger et al. | G06F 12/0811 |
| | | | 711/140 |
| 2013/0138892 A1* | 5/2013 | Loh et al. | G06F 12/123 |
| | | | 711/134 |
| 2015/0046656 A1 | 2/2015 | Blinick et al. | |
| 2020/0174939 A1* | 6/2020 | Nair et al. | G06F 12/0888 |

OTHER PUBLICATIONS

Qureshi et al., "The V-Way Cache: Demand-Based Associativity via Global Replacement", In 32nd International Symposium on Computer Architecture (ISCA'05), IEEE, Jun. 2005, (Pages: 12).

Sardashti Somayeh et al., "Decoupled Compressed Cache: Exploiting Spatial Locality for Energy Optimization", in IEEE Micro, vol. 34, No. 3, pp. 91-99, May-Jun., 2014, DOI: 10.1109/MM.2014.42 (99 pages).

Sardashti Somayeh, "Yet Another Compressed Cache: A Low-Cost Yet Effective Compressed Cache", ACM Transactions on Architecture and Code Optimization (TACO), Vol. 13, No. 3, Pages: 1-25, Sep. 2016, DOI: 10.1145/2976740 (25 pages).

Tsai et al., "Compress Objects, Not Cache Lines: An Object-Based Compressed Memory Hierarchy", In Proceedings of 2019 Architectural Support for Programming Languages and Operating Systems (ASPLOS'19), New York, NY, Apr. 2019, (Pages: 14).

* cited by examiner

US 11,797,446 B2

MULTI PURPOSE SERVER CACHE DIRECTORY

BACKGROUND

The present invention relates in general to computing systems, and more particularly, to various embodiments for providing a multi-purpose server cache directory in a computing systems using a computing processor.

SUMMARY

According to an embodiment of the present invention, a method for providing a multi-purpose server cache directory in a computing environment, by one or more processors, is depicted. One of a plurality of operation modes may be selectively enabled or disabled, by a cache directory, based on a computation phase, data type, and data pattern for caching data in a cache having a plurality of address tags in the cache directory greater than a number of data lines in a cache array.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
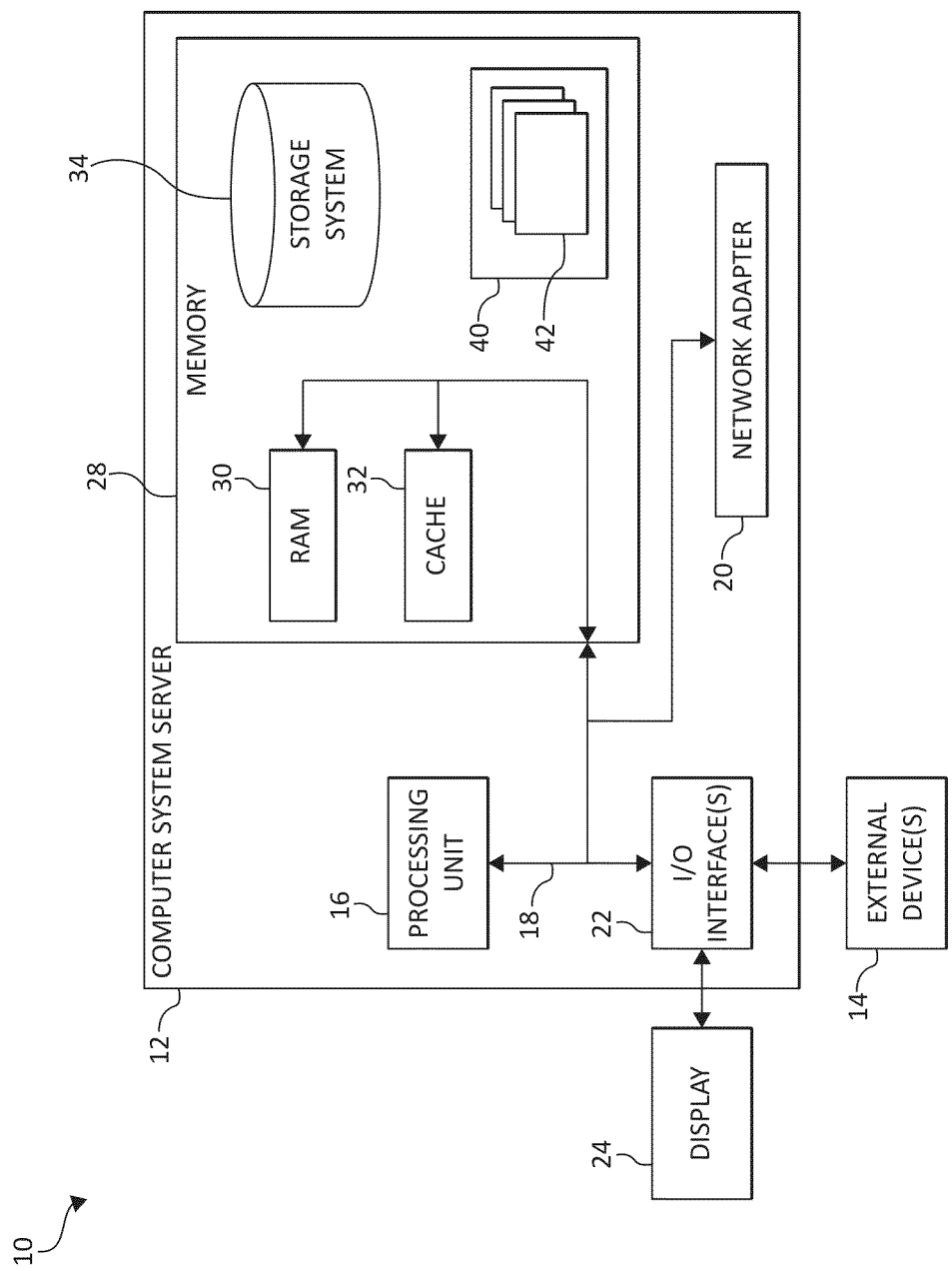
FIG. 1 is a block diagram depicting an exemplary cloud computing node according to an embodiment of the present invention.

Computer hardware caches are temporary holding storages for fast access to frequently used memory data. Said differently, in order to reduce or avoid the time delay (or "latency") of accessing data stored in the main memory of a computer, modern computer processors include a cache memory (or "cache") that stores recently accessed data so that it can be quickly accessed again by the processor. Data that is stored in a cache can be quickly accessed by a processor without the need to access the main memory (or "memory"), thereby increasing the performance of the processor and the computer overall. A cache has a shorter access time than the computer system memory (e.g., frequently referred to as dynamic random-access memory, "DRAM"). Caches are typically constructed with Static Random-Access Memory ("SRAM"), which are faster than DRAM. However, cache capacities are smaller than DRAM. The cache/memory access speed and capacity are inversely proportional.

Several different layers of cache may be provided in a computer system. Level 1 (or primary) cache, for example, is used to store data on behalf of system memory (which comprises random access memory, i.e., RAM) for access by a processor. Level 1 ("L1") cache can be built directly into the processor and can run at the same speed as the processor, providing the fastest possible access time. Level 2 (or secondary) ("L2") cache is also used to store a portion of system memory and may be included within a chip package but is separate from the processor. Level 2 cache has greater capacity than Level 1 cache but is slower. Some systems may even include Level 3 ("L3") cache that has even greater capacity than Level 2 cache. However, Level 3 cache is typically slower than Level 2 cache, yet still faster than the primary storage device, and may be located off the chip package.

Currently, however, one of the challenges a cache encounters is the ability to provide a cache directory that in enabled to serve multiple functions with each function dynamically enabled and disabled per phase of computation, or per data type, or per data pattern. As such, the present invention provides for providing a multi-purpose server cache directory enabled to serve multiple functions, with each function dynamically enabled and disabled per phase of computation, or per data type, or per data pattern in a computing environment. One of a plurality of operation modes may be selectively enabled or disabled, by a cache directory, based on a computation phase, data type, and data pattern for caching data in a cache having a plurality of address tags in the cache directory greater than a number of data lines in a cache array.

In some implementations, the present invention provides a computer cache directory serving multiple functions, each function dynamically enabled and disabled per phase of computation, per data type, and/or per data pattern. A number of address tags in a cache may be increased more than the number of data lines, twice as many address tags than lines in the preferred embodiment.

In a first mode of operation, data lines (e.g., half as many data lines) are compressed and twice as many lines are stored in the cache therefore doubling the cache capacity;

and each compressed line paired with one of those extra tags in the set.

In a second mode of operation, if fewer data lines are compressed, then the unused tags are utilized for storing other historical addresses (and therefore gain some performance using the extra knowledge), cache replacement or prefetching hints to improve cache performance; and/or data type and data status (of the lines).

In a third mode of operation, unused full-size tags may be split in to 2, 3, 4 truncated tags derived from full size tags by hashing, therefore the same cache set may contain more than twice as many tags found in the first mode of operation. Truncated tags have a low probability of hash collision. Truncated tag may use fewer bits. For example, instead of a 40-bit full size tag (100% accurate), there may be 10-bit truncated tag (e.g., 99% accurate and 1% wrong). It is mostly correct, but sometimes wrong. In exchange for being wrong, 4 times as many truncated tags may be achieved as the full-size tag. (accuracy).

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
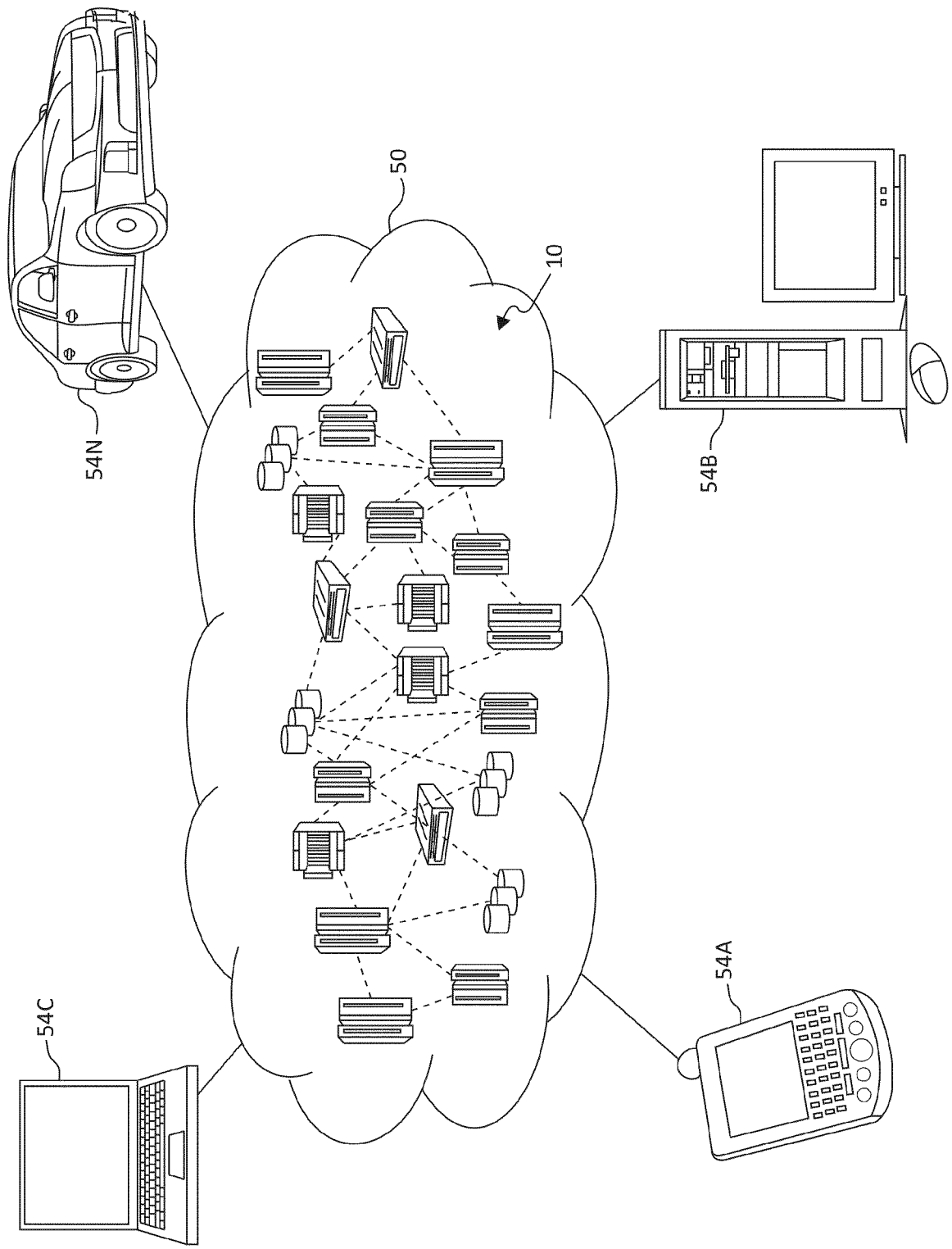
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
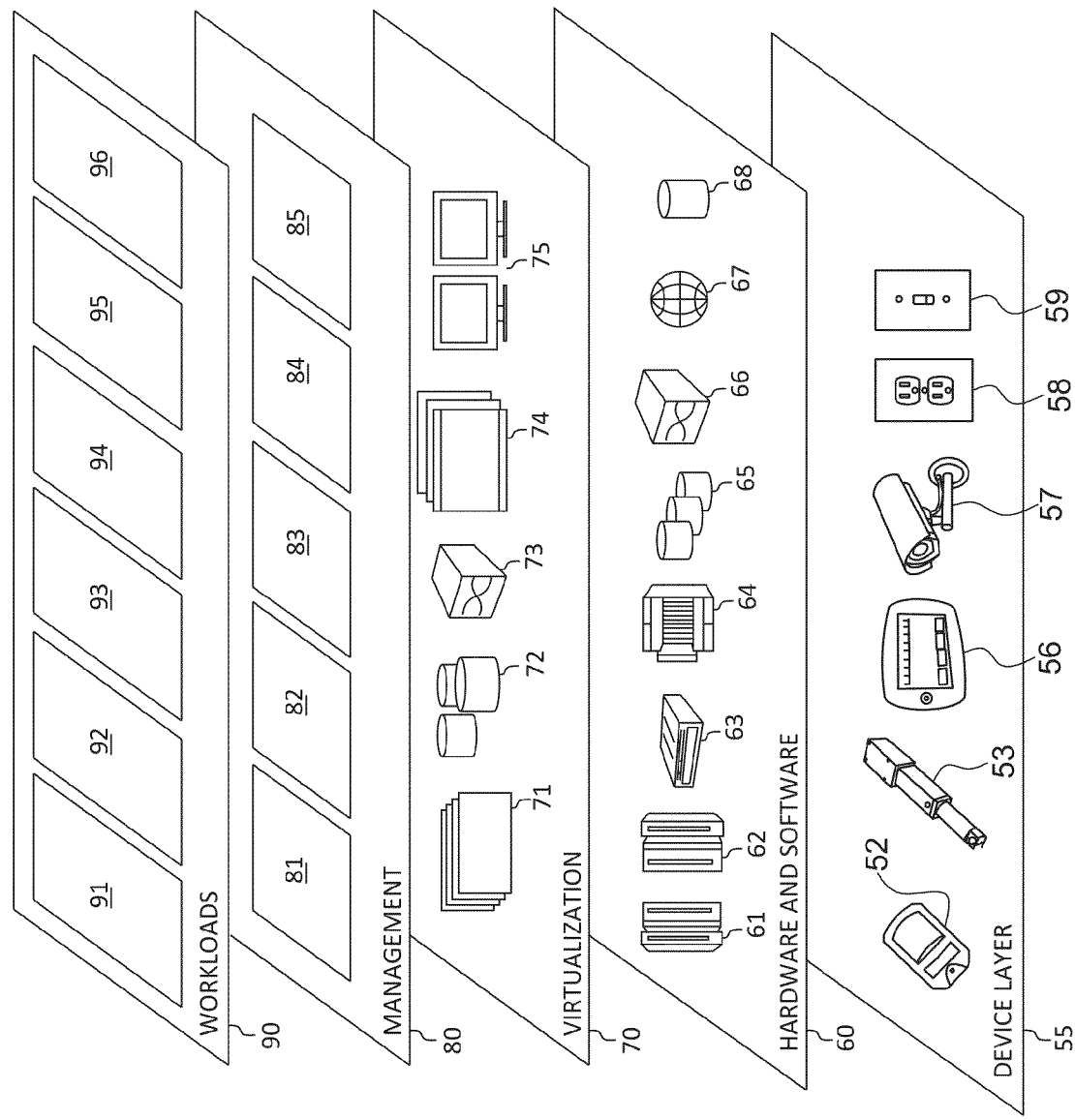
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing a multi-purpose server cache directory in a computing environment (e.g., in a neural network architecture). In addition, workloads and functions 96 for providing a multi-purpose server cache directory in a computing environment may include such operations as interleaving and as will be further described, user and device management functions. One of ordinary skill in the art will appreciate that the workloads and functions 96 for providing a multi-purpose server cache directory in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing a multi-purpose server cache directory in a computing environment. One of a plurality of operation modes may be selectively enabled or disabled, by a cache directory, based on a computation phase, data type, and data pattern for caching data in a cache having a plurality of address tags in the cache directory greater than a number of data lines in a cache array.

In some implementations, the present invention provides a computer cache directory serving multiple functions, each function dynamically enabled and disabled per phase of computation, per data type, and/or per data pattern. A number of address tags in a cache may be increased more than the number of data lines, twice as many address tags than lines in the preferred embodiment.

In a first mode of operation, data lines (e.g., half as many data lines) are compressed and twice as many lines are stored in the cache therefore doubling the cache capacity; and each compressed line paired with one of those extra tags in the set.

In a second mode of operation, if fewer data lines are compressed, then the unused tags are utilized for storing other historical addresses (and therefore gain some performance using the extra knowledge), cache replacement or prefetching hints to improve cache performance; and/or data type and data status (of the lines).

Figure 4A:
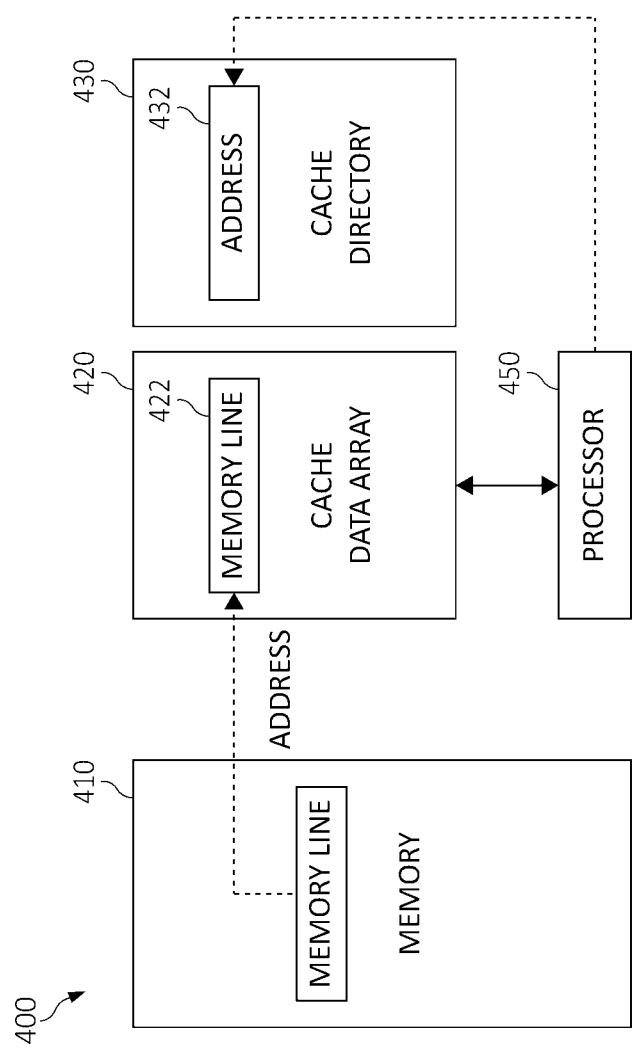
FIGS. 4A-4B are block diagram depicting an exemplary functional relationship between various aspects of the present invention.
Figure 4B:
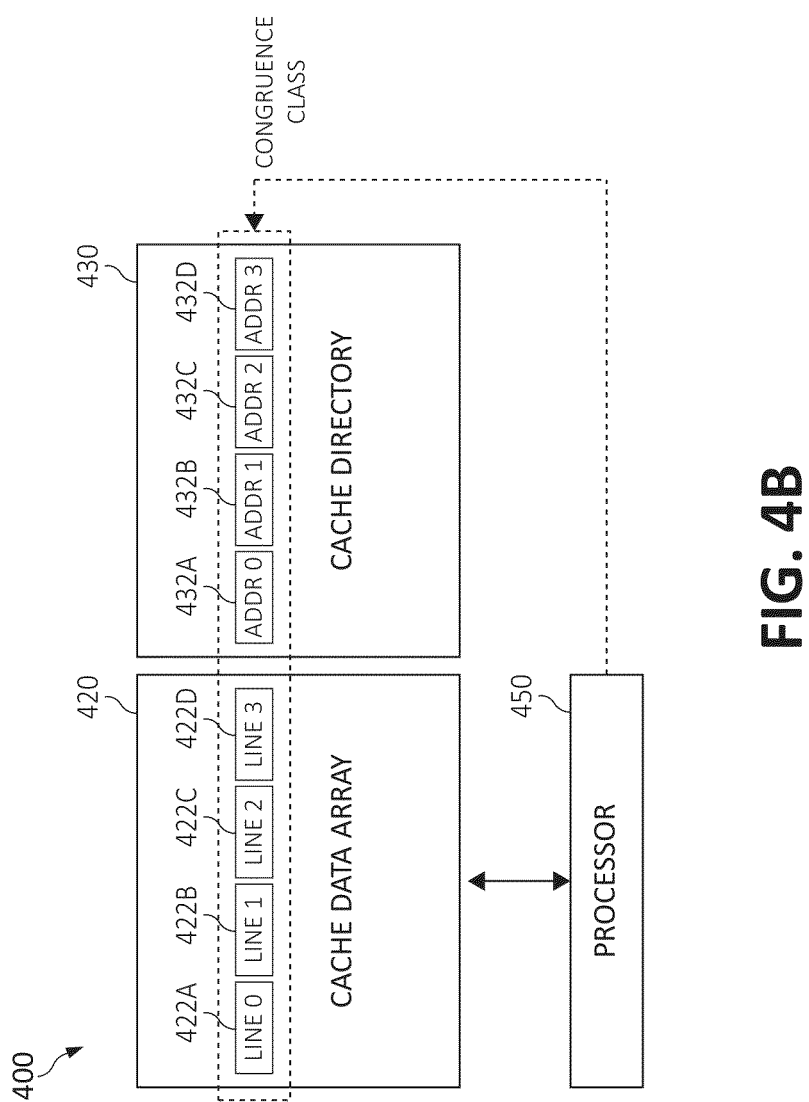

Turning now to FIGS. 4A-4B, a block diagrams depicting exemplary functional components of a cache system 400 for providing a multi-purpose server cache directory in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

The system 400 comprises of a memory 410, a cache 420 (e.g., cache data array) and a cache directory 430, all of which may be in communication with a processor 450.

Data in the cache 420 are stored in "lines," such as, for example, memory line 422, which are contiguous chunks of data (i.e., being a power-of-2 number of bytes long, aligned on boundaries corresponding to this size). A cache line 422 of memory data, typically in units of 64 to 256-bytes long, is stored in a data array location and the respective memory address is stored in the directory, as shown in FIG. 4. The processor 450 will supply the memory address to the cache such as, for example, the cache data array 420. If the address is found in the cache directory 430, the processor 450 may access a respective line of data in the cache 420. If the address is not found in the cache directory 430, the processor 450 may access the respective line of data in the memory 410.

Turning now to FIG. 4B, the cache 420 may be a N-way (e.g., 4-way) set associative cache. The cache 420 may contain 1024 rows, which are called congruence classes. As depicted, the cache 420 is an N-way set associative caches are used, where N is a positive integer such as, for example N is equal to 1 or 32. That is, the cache 420 of FIG. 4B is a 4-way set associative cache (N =4), with N physical cache locations per congruence class, whereby, for example line 0, 1, 2, and 3 (e.g., line 0 422A, line 1 422B, line 2 422C, and line 3 422D can be stored in only one of N positions locations in the cache 420, which are collectively referred to as a "cache set." The cache directory for the memory line such as, for example line 0, 1, 2, and 3 (e.g., line 0 422A, line 1 422B, line 2 422C, and line 3 422D may indicate the M addresses are addr 0 432A, addr 1 432B, addr 2 432C, and addr 3 432D.

In some implementations, a compressed cache contains storage for N uncompressed data lines per set in the data array such as, for example, the cache data array 420 of FIGS. 4A-4B. However, in other implementations, data lines are compressed by a cache system hardware, and more than N lines may be stored in the space for N. Therefore, the N physical data lines can contain up to M compressed data lines, where M is greater than or equal to N. The value of M may be different in each of the N different physical cache locations within a congruence class and may also be different in each of the N different physical cache locations in all the other congruence classes of the cache.

To identify M compressed lines, the cache directory set contains M addresses whereas the cache data array 420 contains only N physical data locations.

Figure 5:
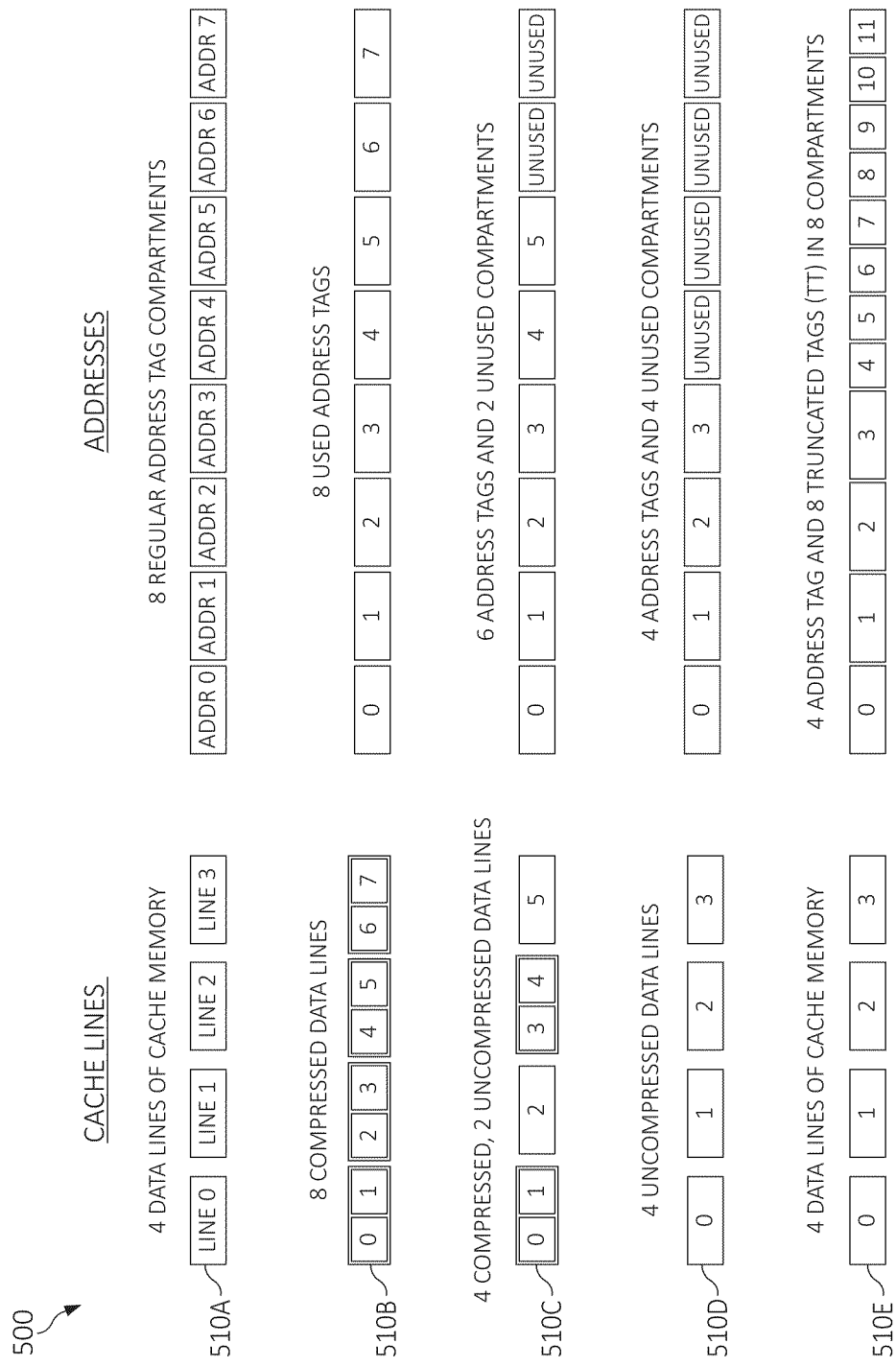
FIG. 5 is a block diagram depicting a cache system for extra compartments for address tags and information in a computing environment according to an embodiment of the present invention.

For further explanation, FIG. 5 is block diagram depicting a cache system for extra compartments for address tags and information in cache lines in a computing environment according to an embodiment of the present invention. As will be seen, many of the functional blocks may also be considered "modules" of functionality, in the same descriptive sense as has been previously described in FIGS. 1-4A-4B. Repetitive description of like elements employed in other embodiments described herein is omitted for sake of brevity.

As depicted in FIG. 5, cache line (a) depicts a compressed cache system with maximum space for, for example N=4 data lines of cache memory and, for example M=8 address tags (e.g., 8 address tag compartments).

Cache line (b) depicts 8 compressed data lines and their 8 respective address tags. However, not all data may be compressed. Fewer than M compressed data lines may be stored in the data array such as, for example, the cache data array 420 of FIGS. 4A-4B. Therefore some of the M address tags may go unused as shown in the cache line (c) of FIG. 5, which depicts 4 compressed (e.g., 0, 1, 3, 4), and 2 uncompressed data lines (2, 5) of the cache lines and 6 address tags (e.g., 0-5) and 2 unused compartments (e.g., "unused").

In some cases, compression may be intentionally disabled, either for the cache in its entirety, for a specific congruence class or for a specific physical cache set. Fewer than M compressed data lines may be stored in the data array. Therefore N minus M address tags may go unused as shown in the cache line (d) of FIG. 5, which depicts 4 uncompressed (e.g., 0, 1, 2, 3) and 4 address tags (e.g., 0-3) and 4 unused compartments (e.g., "unused").

In some cases, some or all tags may be used as "truncated tags" as shown in the cache line (e) of FIG. 5, which depicts 4 data lines of cache memory (e.g., 0, 1, 2, 3) and 4 address tags (e.g., 0-3) and 4 unused compartments (e.g., "unused"). Truncated tags (TT) use fewer bits than regular address tags. For example, 2, 3, or 4 TTs in the space of one regular tag may be stored. Therefore, additional tags are available for tracking address history of the cache set. Fewer bits are possible because the tags need not be precisely matched and occasional false positives in matching the tags may be permissible. The primary focus and goal of the present disclosure is to beneficially utilize SRAM bits allocated for the address tags even when all or some of the data lines are not compressed.

In some implementations, extra tags ("ET") may be used. The N address tags tracked for N data lines may be extended to M tags, where M is greater than N. For example, M may be equal to 8 and N is equal to 4 (e.g., M = 8 and N = 4). Although the extra data lines are not stored in the cache, the extra tags ("ET") (i.e., unused before) enable more efficient (e.g., better) replacement decisions since the extra tags ("ET") retain historical and/or heuristic information about the data line, which can be leveraged to improve overall cache performance over time.

In some implementation, when the requested address is a miss, the address is not found among the N tags but may be found among the extra set of N — M tags. The extra tags ("ET") may be used to indicate that the address has been present in the cache in the recent past. This information could, for example, be used to infer the extra tags ("ET") line is frequently accessed and therefore may benefit from applying the extra tags ("ET") information into the selection process for the address/data pair install position (i.e., most recently used ("MRU") position, etc.) among the N lines so that it can be retained longer in the cache to avoid a future miss.

In the alternative, when the address is not found among any tags, this indicates that the address has not been present in the cache in the recent past. Then, the address/data pair may be considered probationary, meaning the data line may not be accessed in the future. Therefore, it may not be necessary to replace any of the N data lines. The probationary address ("addr")/data pair may be installed in the least recently used ("LRU") position of the N tags. The probationary data line is not installed, but the address is recorded in the ET set of tags. The probationary data line may be used to skip persistence to next-level or virtual-next level caches upon eviction.

In some implementations, even more tags may be used. For example, when an address tag does not have the respective data line in the cache, it is not necessary to store the full address tag (e.g., approximately 40 bits wide) in the tag compartments. Rather, shorter truncated tags ("TT") (approximately 10 bits wide) may serve as digest of regular tags useful for implementing replacement algorithms that can track longer history, e.g., 4 times as many TTs compared to full tags. TTs may have rare false positive matches to a requested address but may be acceptable for replacement operation purposes. Two non-equal regular tags (e.g., 40-bits hashed to 10-bits) may have $1/1024$ chance of their hashes testing equal. A set of 16 TTs have 1.5%.

For further explanation of the truncated tags (TT), consider the following. Assume having more tags stored in the cache directory (e.g., cache directory 420 of FIGS. 4A-4B) is desirable since longer access history can be retained, which may improve cache replacement and prefetch algorithms with higher performance. The truncated tags (TT) may be a shorter digest of a regular address tag. Also, assume that a regular address tag has 40-bit length. The 40-bit value may be hashed to a 10-bit value (e.g. using some XOR operation).

Therefore, in the same space of one regular tag, there can be 4 TTs stored. Thus, for a given L3 cache directory budge, there may be 4 times as many TTs that may be stored. The cache line (e) of FIG. 5 illustrates this concept (e.g., only 2 TTs per regular tag shown in the FIG. 5). Since these TTs do not have the respective data lines in the data-array, the TT's are not used as regular address tags. Thus, it may not be desirable to precisely match a requested address since the requested address may be used to check whether a current address has been requested in the past or not.

Depending on the whether or not the requested address has been requested in the past, as indicated by the TT, different replacement and prefetching decisions may be used requested address. An occasional erroneous indication from the hashed TT may be acceptable if the error does not substantially degrade the cache hit ratio. A good hashing function will randomize the 10-bit TT values. A randomly selected 10-bit value may be determined/calculated has only 1.5% chance of being equal with 16 other randomly selected 10-bit values (few more bits may be used to reduce the error, e.g. 11-bit a 0.8% and 12-bit a 0.4%). The error may be an acceptable tradeoff while some errors in exchange for more tags and history. Being wrong 1.5% of the time during replacement should not appreciably change the hit ratio of a cache with 70-90% hit ratio.

In other implementations, the least frequently used" ("LFU") operation may be used. In one aspect, the present invention provides for compartments to be used for tracking the frequency of the data line access. Each compartment counts the number of times a data line is accessed.

Accordingly, the "least frequently used" replacement operation may be implemented for workloads benefiting from the LFU operation. In the same manner, in a general embodiment of the invention, different access and recency information may be stored in the compartments therefore implementing a variety of replacement algorithms. In the LFU algorithm, the smallest count line is evicted at the time of replacement.

Figure 6:
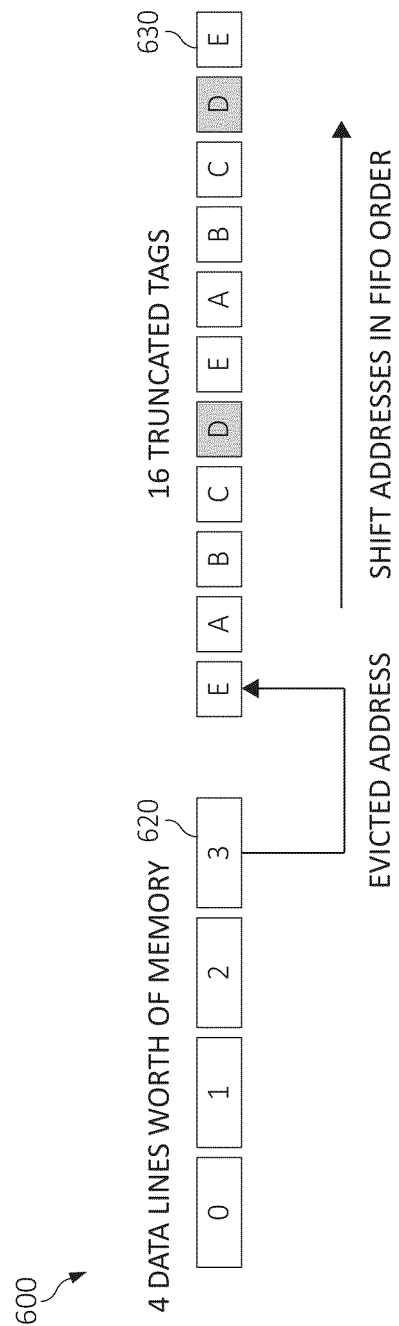
FIG. 6 is a block diagram depicting an operations for recognizing circular address patterns and making replacement decisions in a computing environment according to an embodiment of the present invention.

For further explanation, FIG. 6 is a block diagram depicting an operation for recognizing circular address patterns and making replacement decisions. As will be seen, many of the functional blocks may also be considered "modules" of functionality, in the same descriptive sense as has been previously described in FIGS. 1-5. Repetitive description of like elements employed in other embodiments described herein is omitted for sake of brevity.

As depicted, FIG. 6 depicts 4 data lines of memory such as, for example, 4 data lines at addresses A, B, C, D, and E and 16 truncated tags. In one aspect, circular references and other patterns (e.g., E, A, B, C, D, E, A, B, C, D, E, A, B, C, D, and E) may be detected by recognizing circular address patterns and making replacement decisions. For example, one or more of the ETs and the TTs may store the addresses of the "addr/data pairs" evicted from the cache such as, for example, cache lines 422A-D of the cache data array 420.

The stored addresses may be stored in the first-in-first-out order. When the data line access pattern is circular, for example, but incorporates more than N data lines, the ETs/TTs may be utilized to detect the access pattern. For example, as depicted in FIG. 6, the 4 data lines at addresses A, B, C, D, and E are accessed in a circular pattern such as, for example, E, A, B, C, D, E, A, B, C, D, E, A, B, C, D, and E. The install position selection operation may recognize a pattern (e.g., a circular pattern) and it will refuse to replace D with E rather than retaining D in the cache because it will result in higher cache hit rate. The identified pattern (e.g., the identified circular pattern) may be one of variety of such patterns that this method can recognize, such as, for example, a stack order (e.g., A, B, C, D, E, D, C, B, A ...).

Additionally, in some implementations, the data line activity may be tracked. For example, the unused M-tag entries may be used to track the activity (or lack thereof) related to a particular line during its residency in the cache. Examples of such activities may include, but are not limited to, the amount of time a line has been resident in a cache, the number of times a line was accessed, the number of times a line was changed, the average amount of time between accesses and/or updates. This information (e.g., the data line activity) may be captured via a system information gathering hardware data sampling mechanism for use in performance metric analysis to help design future machines and improve performance.

Also, the knowledge of such cache line activities may also be used to affect the install position operation for a cache miss to the same set. The knowledge of such cache line activities may also be used to affect the persistence operation for installations to next-level or virtual-next level caches.

In other implementations, one or more instruction and data lines may be identified. For example, the unused M-tag entries in a cache (e.g., the L3 cache) may be used to record if a given data line contains data or instruction. The knowledge of such cache line activities may also be used to affect the install position operation for a cache miss to the same set. The knowledge of such cache line activities may also be used to affect the persistence operation for installations to next-level or virtual-next level caches.

In some implementations, one or more extra compartments may be used to support a cache prefetch operations to improve cache performance. In one aspect, a prefetching (as compared to demand prefetching) is bringing data lines into the cache (e.g., from lower levels of a memory hierarchy) in anticipation of future demand requests.

For example, prefetched data lines may be marked "prefetched" in one or more unused tags sections. If a prefetched line is evicted without any use, the prefetching operation may be turned off as it's causing useless prefetches.

If the cache set has a miss, and a prefetched line is present in the set, then the prefetcher may be turned off as it's causing harmful prefetches by displacing useful cache lines. The knowledge that a data line is prefetched in conjunction with the knowledge that its data is unchanged may also be used to affect the install position operation for a miss to the same set. For example, a prefetched line that was not accessed could be selected for eviction instead of a demand fetch line or a prefetched line that was accessed. This knowledge could also be used to affect the "persistence operation" for installations to next-level or virtual-next level caches.

In one aspect, a "Persistence operation" refers to a decision operation used to determine if a line that ages out of a particular cache instance at a particular cache level (i.e., L3 cache) should or should not be installed into another instance of the distributed cache (e.g., a "victim" cache) at the same cache level, and, if it is installed, at which position. For example, a most recent accessed first and second line addresses may be hashed in to one of the extra compartments. In some implementations, the victim cache is the cache that receives the cache line cast out the requesting cache (e.g., evicted line) to make room for the fetched line.

When a third address is installed (into an MRU position), the hashed position may store the 3rd address or the arithmetic difference from 2nd address to 3rd. Accordingly, if another pair of address pairs arrive, the 3rd address may be computed before occurring and the line is prefetched accordingly.

To further illustrate, consider the following depicting how a prefetch operation works. In one aspect, a Load Store Unit (LSU) of the processor such as, for example, processor 450 may include a prefetch engine on the side that generates prefetch requests from the historical address patterns and stores them in a prefetch request buffer. The prefetch brings data lines into the cache 420 (from lower levels of the memory hierarchy) in anticipation of future demand requests. A prefetch request in the output buffer is issued to an LSU port with a lower priority than demand requests from the Instruction Sequencing Unit ("ISU"), which executes instructions. Once a prefetch request receives the priority, the prefetch request goes through an LSU pipeline where it accesses the cache and TLB. If it misses the current cache, it will access the next-level cache or memory if it misses the current cache.

Figure 7:
FIG. 7 is a diagram depicting a directory for a prefetch operation in a computing environment according to an embodiment of the present invention.

For further explanation, FIG. 7 is a diagram depicting a directory 700 for a prefetch operation in a computing environment according to an embodiment of the present invention. As will be seen, many of the functional blocks may also be considered "modules" of functionality, in the same descriptive sense as has been previously described in FIGS. 1-6. Repetitive description of like elements employed in other embodiments described herein is omitted for sake of brevity.

As depicted, the directory 700 may include one or more columns (e.g., bit definition, 0, and 1) and rows. Each tag entry maintains additional 4-bit information in the directory 700 regarding the demand/prefetch activities (DPA) on the corresponding cache line.

In one aspect, DPA includes DPI (Demand or Prefetch Install), DH (Demand Hit), PH (Prefetch Hit) and DPE (Demand or Prefetch Eviction). DPI is set depending on whether the cache line was installed by demand or prefetch request. DH and PH indicate whether the installed cache line was referenced by subsequent demand or prefetch request. DPE is set depending on weather the cache line was evicted from the cache by demand or prefetch request. The directory 700 may include a first row having a DPI that is set when a cache line installed by demand or prefetch request. The 0 indicates the cache line was installed by demand request and a 1 indicates the cache line was installed by prefetch request. The second row having a DH that is set when a demand request hit the cache line. The 1 indicates the cache line has been referenced by any demand request and the 0 indicates the cache line has never referenced by a demand request. The third row having a PH is set when a prefetch request hit the cache line. The 1 indicates the cache line has been referenced by any prefetch request and the 0 indicates the cache line has never referenced by a prefetch request. In the fourth row, a DPE is set when a cache line is evicted from the cache by demand or prefetch request. The 0 indicates the cache line was evicted by demand request and a 1 indicates the cache line was evicted by prefetch request. When a cache line is evicted from a cache, the evicted address tag and it's DPA are copied to the extra section of the directory.

Figure 8A:
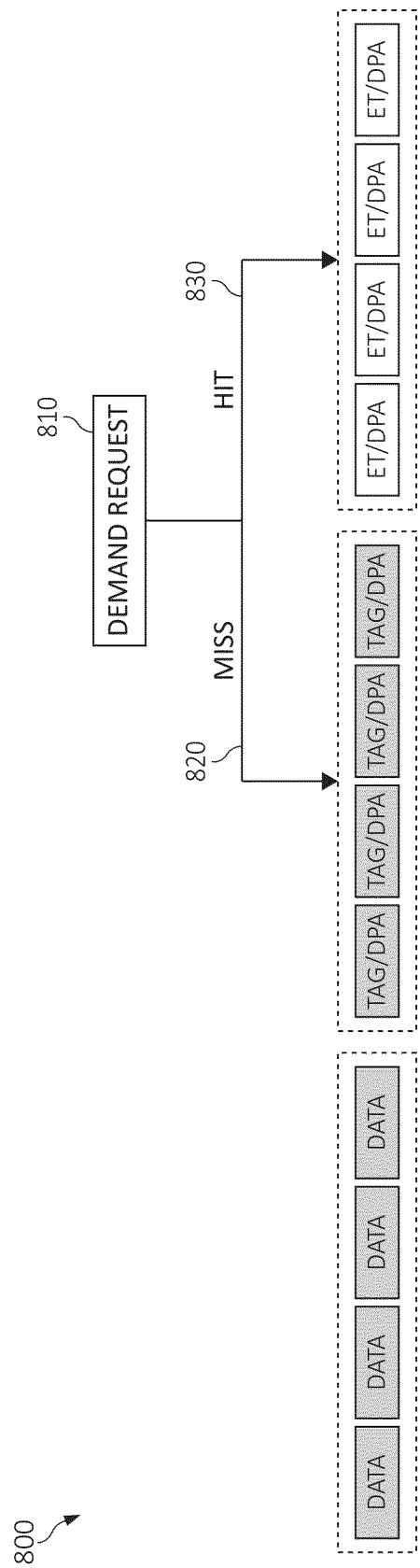
FIG. 8A is block diagram depicting demand requests in a cache line having four data/address tags and four tags-but-no-data in an extra tag ("ET") section in a computing environment according to an embodiment of the present invention.
Figure 8B:
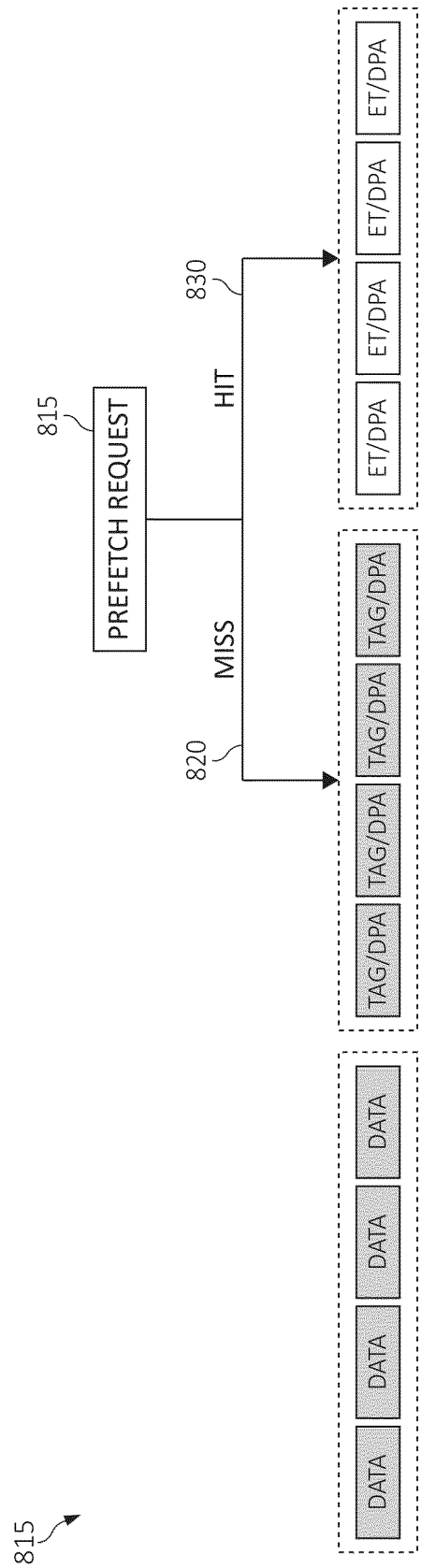
FIG. 8B is block diagram depicting prefetch requests in a cache line having four data/address tags and four tags-but-no-data in an extra tag ("ET") section in a computing environment according to an embodiment of the present invention.

For further explanation, FIGS. 8A-8B are block diagram depicting demand requests and prefetch requests in a cache line having four data/address tags and four tags-but-no-data in an extra tag ("ET") section in a computing environment according to an embodiment of the present invention. As will be seen, many of the functional blocks may also be considered "modules" of functionality, in the same descriptive sense as has been previously described in FIGS. 1-7. Repetitive description of like elements employed in other embodiments described herein is omitted for sake of brevity.

In FIG. 8A, demand requests in a cache line having four data/address tags and four tags-but-no-data in an extra tag ("ET") section are depicted. The DPI, DH, and PH are stored with regular tag address and copied into extra tag section when the corresponding cache line evicted from the cache. The DPE is also stored in the extra tag section when the corresponding cache line evicted from the cache. When a demand request missed the cache but hit the extra tag section, then the DPA information is used to take proper action to control prefetch aggressiveness or change cache install location.

In some implementations, the DPI is 0 and the DPE is equal to 1, which means that the ET hit line was installed by a demand request then evicted by a prefetch request, and then is being request by a demand request again. In this case, the demand request would have been a regular hit (with data) if the line was not evicted by a prefetch request earlier. The action is to reduce prefetch aggressiveness or increment a harmful prefetch count (e.g., "Harmful_Prefetch_Count") and to disable prefetch engine if the harmful prefetch count exceeds a threshold.

The DPI is 0 and the PH is equal to 1, which means that the ET hit line was installed by demand then hit by prefetch before being evicted. Now, a demand request hits the ET hit line again in the ET section. In this case, the old prefetch request can be assumed to be too late and useless. The action is to increase prefetch aggressiveness to generate prefetch request faster or increment a "useless prefetch count" and disable prefetch engine if the useless prefetch count reaches a predefined threshold.

The DPI is 0 and the DH is equal to 0, which means that the ET hit line was installed by a demand request, and then never used by any demand request before being evicted, and now requested by a demand request again. In this case, the new demand installed line may not be used again once installed. The action is to install the new demand installed line in the LRU position.

The DPI is 1 and the DH is equal to 0, which means that the ET hit line was installed by a prefetch request, never used by demand request before being evicted, and now requested by a demand request. In this case, the old prefetch request could have been useful, but it was installed too early. The action is to reduce prefetch aggressiveness.

Turning now to FIG. 8B, when a prefetch request missed the cache but hit the extra tag section, then the DPA information is used to take proper action to control prefetch aggressiveness or change cache install location.

In some implementations, the DPI is 1 and the DH is equal to 1, which means that the ET hit line was installed by a prefetch request and used by a demand request before being evicted, and now requested by prefetch request again. In thie case, the new prefetch request can be assumed to be useful. The action is to install the new prefetched lines as MRU.

The DPI is 1, the DH is equal to 0, which means that the ET hit line was installed by a prefetch request and never hit by demand request before being evicted, and now is requested by a prefetch request again. In this case, the new prefetch request might not be useful. The action is to install the new prefetched line as LRU.

The DPI is 1, the DH is equal to 0, and the PH is 1, which means that the ET hit line was installed by a prefetch request and never hit by demand request but hit by prefetch request before being evicted, and now requested by a prefetch request again. In this case, the prefetch request can be assumed to be too aggressive. The action is to reduce prefetch aggressiveness or increment "useless prefetch count" and disable prefetch engine if the count reaches a predefined threshold.

Figure 9:
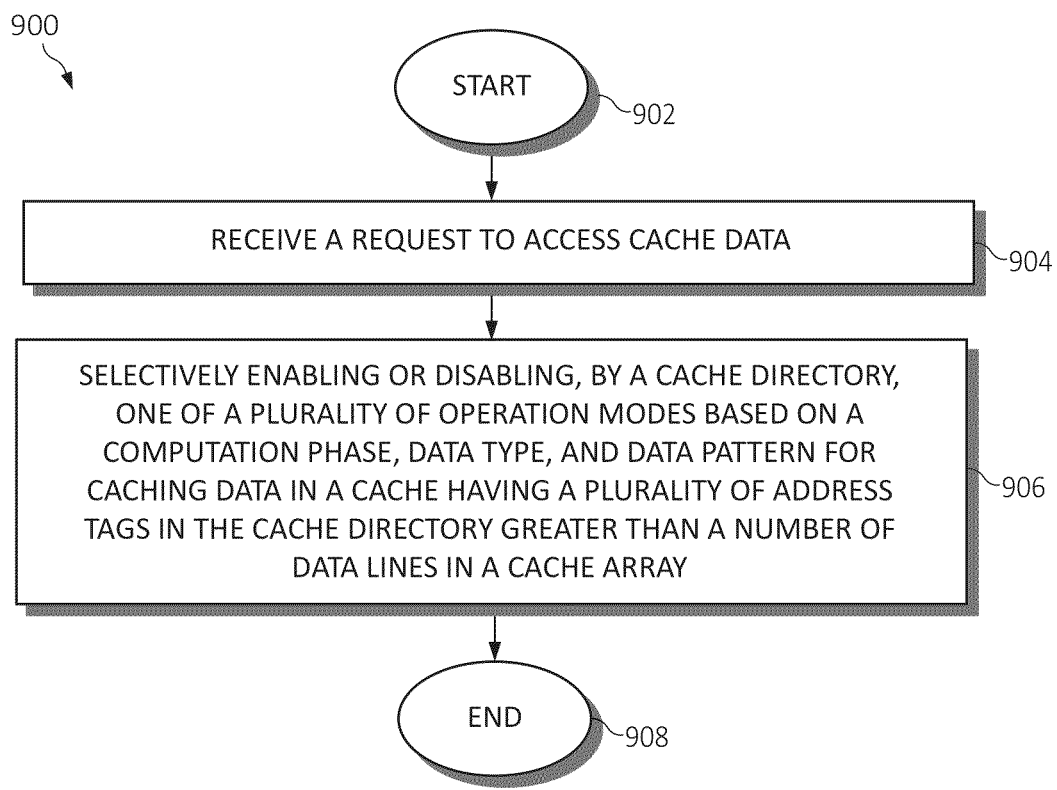
FIG. 9 is a flowchart diagram depicting an additional exemplary method for providing a multi-purpose server cache directory in a computing environment according to an embodiment of the present invention.

Turning now to FIG. 9, a method 900 for providing a multi-purpose server cache directory in a computing environment using a processor is depicted, in which various aspects of the illustrated embodiments may be implemented. The functionality 900 may be implemented as a method (e.g., a computer-implemented method) executed as instructions on a machine, where the instructions are included on at least one computer readable medium or one non-transitory machine-readable storage medium. The functionality 900 may start in block 902.

A request to access cache data may be received, as in block 904. One of a plurality of operation modes may be selectively enabled or disabled, by a cache directory, based on a computation phase, data type, and data pattern for caching data in a cache having a plurality of address tags in the cache directory greater than a number of data lines in a cache array, as in block 906. The functionality 900 may end, as in block 908.

In one aspect, in conjunction with and/or as part of at least one blocks of FIG. 9, the operations of method 900 may include each of the following. The operations of method 900 may compress a selected number of data lines in the cache such that the cache array stores an increase in a number of the amount of cache lines (e.g., double or triple the amount of cache lines) and pair one or more unused address tags from the plurality of address tags with each of the selected number of data lines that are cached. The operations of method 900 may selectively enable or disable a second operation mode, where the second operation mode compresses a selected number of data lines in the cache less than the plurality of address tags, wherein unused address tags are used for storing historical addresses, prefetching hints, and the data type and data status.

The operations of method 900 may selectively enable or disable a third operation mode, wherein the third operation mode splits one or more unused address tags of the plurality of address tags into one or more truncated tags to increase a total number of the plurality of address tags, where the total number of the plurality of address tags are greater than a total number of the plurality of address tags use in a first operation mode.

The operations of method 900 may detect the computation phase, the data type, and the data pattern for selectively enabling or disabling a first operation mode, a second operation mode, and a third operation mode.

The operations of method 900 may track activities associated with of the data lines using one or more unused address tags of the plurality of address tags. The operations of method 900 may use one or more unused address tags of the plurality of address tags for prefetch operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a multi-purpose server cache directory in a computing environment by one or more processors comprising:
    selectively enabling or disabling, by a cache directory, one of a plurality of operation modes based on a computation phase, data type, and data pattern for caching data in a cache having a plurality of address tags in the cache directory greater than a number of data lines in a cache array.

2. The method of claim 1, further including selectively enabling or disabling a first operation mode, wherein the first operation mode:
    compresses a selected number of data lines in the cache such that the cache array stores an increase in a number of the amount of cache lines; and
    pairs one or more unused address tags from the plurality of address tags with each of the selected number of data lines that are cached.

3. The method of claim 1, further including selectively enabling or disabling a second operation mode, wherein the second operation mode compresses a selected number of data lines in the cache less than the plurality of address tags, wherein unused address tags are used for storing historical addresses, prefetching hints, and the data type and data status.

4. The method of claim 1, further including selectively enabling or disabling a third operation mode, wherein the third operation mode splits one or more unused address tags of the plurality of address tags into one or more truncated tags to increase a total number of the plurality of address tags, wherein the total number of the plurality of address tags are greater than a total number of the plurality of address tags use in a first operation mode.

5. The method of claim 1, further including detecting the computation phase, the data type, and the data pattern for selectively enabling or disabling a first operation mode, a second operation mode, and a third operation mode.

6. The method of claim 1, further including tracking activities associated with of the data lines using one or more unused address tags of the plurality of address tags.

7. The method of claim 1, further including using one or more unused address tags of the plurality of address tags for prefetch operations.

8. A system for providing a multi-purpose server cache directory in a computing environment, comprising:
    one or more computers with executable instructions that when executed cause the system to:

selectively enable or disable, by a cache directory, one of a plurality of operation modes based on a computation phase, data type, and data pattern for caching data in a cache having a plurality of address tags in the cache directory greater than a number of data lines in a cache array.

9. The system of claim 8, wherein the executable instructions when executed cause the system to:
 compress a selected number of data lines in the cache such that the cache array stores an increase in a number of the amount of cache lines; and
 pair one or more unused address tags from the plurality of address tags with each of the selected number of data lines that are cached.

10. The system of claim 8, wherein the executable instructions when executed cause the system to selectively enable or disable a second operation mode, wherein the second operation mode compresses a selected number of data lines in the cache less than the plurality of address tags, wherein unused address tags are used for storing historical addresses, prefetching hints, and the data type and data status.

11. The system of claim 8, wherein the executable instructions when executed cause the system to selectively enable or disable a third operation mode, wherein the third operation mode splits one or more unused address tags of the plurality of address tags into one or more truncated tags to increase a total number of the plurality of address tags, wherein the total number of the plurality of address tags are greater than a total number of the plurality of address tags use in a first operation mode.

12. The system of claim 8, wherein the executable instructions when executed cause the system to detect the computation phase, the data type, and the data pattern for selectively enabling or disabling a first operation mode, a second operation mode, and a third operation mode.

13. The system of claim 8, wherein the executable instructions when executed cause the system to track activities associated with of the data lines using one or more unused address tags of the plurality of address tags.

14. The system of claim 8, wherein the executable instructions when executed cause the system to use one or more unused address tags of the plurality of address tags for prefetch operations.

15. A computer program product for providing a multi-purpose server cache directory in a computing environment, the computer program product comprising:
 one or more computer readable storage media, and program instructions collectively stored on the one or more computer readable storage media, the program instruction comprising:
 program instructions to selectively enable or disable, by a cache directory, one of a plurality of operation modes based on a computation phase, data type, and data pattern for caching data in a cache having a plurality of address tags in the cache directory greater than a number of data lines in a cache array.

16. The computer program product of claim 15, further including program instructions to:
 compress a selected number of data lines in the cache such that the cache array stores an increase in a number of the amount of cache lines; and
 pair one or more unused address tags from the plurality of address tags with each of the selected number of data lines that are cached.

17. The computer program product of claim 15, further including program instructions to:
 selectively enable or disable a second operation mode, wherein the second operation mode compresses a selected number of data lines in the cache less than the plurality of address tags, wherein unused address tags are used for storing historical addresses, prefetching hints, and the data type and data status.

18. The computer program product of claim 15, further including program instructions to:
 selectively enable or disable a third operation mode, wherein the third operation mode splits one or more unused address tags of the plurality of address tags into one or more truncated tags to increase a total number of the plurality of address tags, wherein the total number of the plurality of address tags are greater than a total number of the plurality of address tags use in a first operation mode.

19. The computer program product of claim 15, further including program instructions to:
 detect the computation phase, the data type, and the data pattern for selectively enabling or disabling a first operation mode, a second operation mode, and a third operation mode; and
 track activities associated with of the data lines using one or more unused address tags of the plurality of address tags.

20. The computer program product of claim 15, further including program instructions to use one or more unused address tags of the plurality of address tags for prefetch operations.

\* \* \* \* \*